Figure 1:
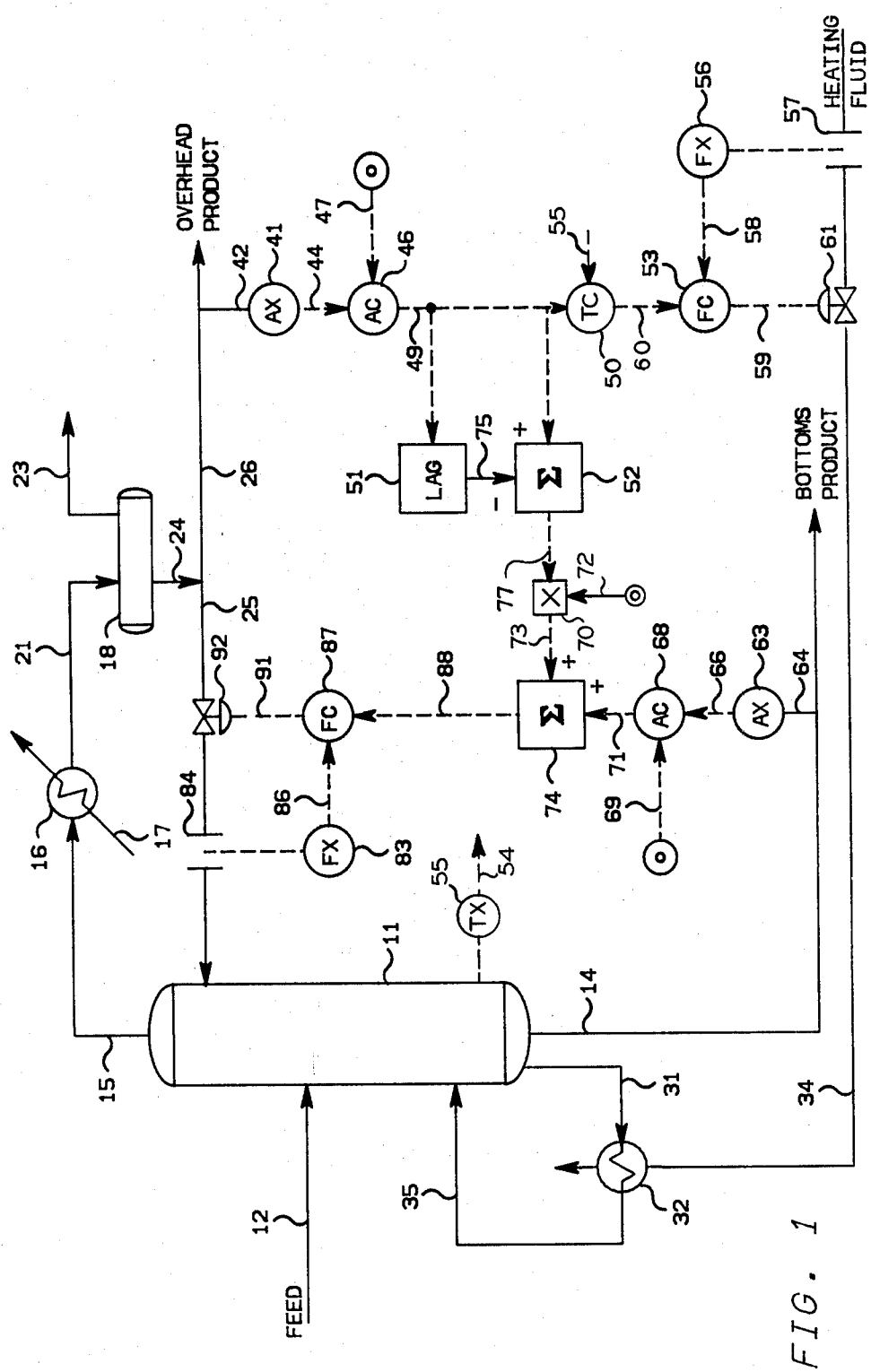

United States Patent [19]
DiBiano et al.

[11] 4,371,426
[45] Feb. 1, 1983

[54] CONTROL OF A FRACTIONAL DISTILLATION PROCESS

[75] Inventors: Robert J. DiBiano; James W. Hobbs, both of Sweeny, Tex.

[73] Assignee: Phillips Petroleum Company, Bartlesville, Okla.

[21] Appl. No.: 293,065

[22] Filed: Aug. 17, 1981

[51] Int. Cl.³ .............................................. B01D 3/42
[52] U.S. Cl. .......................................... 203/2; 203/3;
62/21; 62/37; 202/160; 202/206; 364/501;
585/809
[58] Field of Search ........................................ 203/1–3,
203/DIG. 18; 202/160, 206; 196/132; 62/21,
37; 208/DIG. 1; 585/809, 956, 701, 501;
364/501

[56] References Cited

U.S. PATENT DOCUMENTS

| | | | |
|---|---|---|---|
| 3,018,230 | 1/1962 | Morgan | 203/3 |
| 3,156,628 | 11/1964 | Larrison | 203/3 |
| 3,308,040 | 3/1967 | Johnson et al. | 203/3 |
| 3,309,287 | 3/1967 | Lupfer et al. | 203/3 |
| 3,336,205 | 8/1967 | Rijnsdorp et al. | 203/3 |
| 3,354,053 | 11/1967 | Johnson | 203/3 |
| 3,361,646 | 1/1968 | MacMullan et al. | 203/3 |
| 3,449,215 | 6/1969 | Johnson et al. | 203/3 |
| 3,840,437 | 10/1974 | Awan et al. | 202/160 |
| 4,252,614 | 2/1981 | Stewart | 203/3 |

*Primary Examiner*—Wilbur L. Bascomb, Jr.

[57] ABSTRACT

In a fractional distillation column in which at least a first component and a second component are at least partially separated with the first component being removed principally as an overhead product and the second component being removed principally as a bottoms product and in which the heat supplied to the fractional distillation column is used as the primary control for the overhead product composition with the flow rate of external reflux to the fractional distillation column being used to control the bottoms product composition, a comparison of the actual concentration of the second component in the overhead product to the desired concentration is utilized to bias the control signal which is utilized to manipulate the flow rate of the external reflux to the fractional distillation column. The bias term provides a quick response to an off-specification overhead product by changing the flow rate of the external reflux so as to maintain a desired overhead product composition until the heat supplied to the fractional distillation column can be changed to maintain the desired overhead product composition.

12 Claims, 1 Drawing Figure

CONTROL OF A FRACTIONAL DISTILLATION PROCESS

This invention relates to method and apparatus for controlling a fractional distillation process. In one aspect, this invention relates to method and apparatus for maintaining a desired overhead product composition in a fractional distillation process in which the heat supplied to the fractional distillation process is the primary factor utilized to control the overhead product composition.

Fractional distillation columns are employed in many chemical manufacturing processes to make desired separations. Typically, at least an overhead product and a bottoms product are removed from the fractional distillation process. The composition of the overhead product can be controlled by manipulating the heat supplied to the fractional distillation column while the composition of the bottoms product can be controlled by manipulating the flow rate of the external reflux.

The overhead product is often more valuable than the bottoms product. However, it may be difficult to maintain close control of the overhead product composition because of the time required for a change in the heat supplied to the fractional distillation process to effect a change in the overhead product composition. Long periods of off-specification overhead product may result which is totally undesirable especially in a situation where the overhead product is the more valuable product.

It is thus an object of this invention to provide method and apparatus for maintaining a desired overhead product composition in a fractional distillation process where the heat supplied to the fractional distillation process is the primary factor used to control the overhead product composition.

Both the brief description of the invention and the detailed description of the invention are given in terms of an ethylene manufacturing process and specifically in terms of the ethylene fractionator which separates ethylene from ethane. However, the invention is applicable to other fractional distillation processes in which the heat supplied to the fractional distillation process is the primary factor used to control the overhead product composition.

In a typical ethylene manufacturing process, a feed stream consisting essentially of ethylene and ethane is supplied to the ethylene fractionator. Ethylene is removed as an overhead product while ethane is removed as a bottoms product. The ethane will typically be recycled to the cracking furnace associated with the ethylene manufacturing process. Close control of the composition of the ethylene overhead product is desirable because the ethylene is not saleable with too much ethane in it and too little ethane in the overhead product means that either energy is being wasted in over-separating or ethylene is being wasted in the bottoms product. The composition of the overhead product is typically maintained by manipulating the heat supplied to the fractional distillation column. The composition of the bottoms product is typically maintained by manipulating the flow rate of the external reflux to the fractional distillation column. As has been previously stated, this type of control may result in off-specification overhead product for a long period of time because of the time required for a change in the heat supplied to the fractional distillation column to result in a change in the overhead product composition.

In accordance with the present invention, method and apparatus is provided whereby a comparison of the actual ethane concentration in the overhead product to the desired ethane concentration in the overhead product is utilized to bias the control signal which is utilized to manipulate the flow rate of the external reflux to the fractional distillation column. The bias term provides a quick response to an off-specification overhead product by changing the flow rate of the external reflux so as to maintain a desired overhead product composition. The effect of the bias term remains until the primary overhead product composition control based on the heat supplied to the fractional distillation column has had time to react to the off-specification overhead product. Thus, short term control is provided by the described bias term while long term control remains with the standard overhead product composition control based on the heat supplied to the fractional distillation column.

Other objects and advantages of the invention will be apparent by the foregoing brief description of the invention and the appended claims as well as from the detailed description of the drawing which is briefly described as follows:

FIG. 1 is a diagrammatic illustration of an ethylene fractionator with the associated control system of the present invention.

While the invention is illustrated and described in terms of a specific fractional distillation process for the separation of ethylene from ethane and a specific control system for the fractional distillation process, the invention is also applicable to different types and configurations of fractional distillation processes as well as different types of control system configurations which accomplish the purpose of the present invention.

A specific control system configuration is set forth in FIG. 1 for the sake of illustration. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to implement a part of the control system. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

Both the analog and digital controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a fractional distillation column 11. A feed stream consisting essentially of ethylene and ethane is provided to the fractional distillation column 11 through conduit means 12. Ethane is removed as a bottoms product through conduit means 14. The ethane would typically be recycled to the cracking furnace associated with the ethylene manufacturing process. Ethylene is removed in an overhead stream from the fractional distillation column 11 through conduit means 15. The overhead stream flowing through conduit means 15 is provided from the fractional distillation column 11 through conduit means 15 to the heat exchanger 16. The heat exchanger 16 is provided with a cooling medium through conduit means 17. The at least partially condensed fluid stream from the heat exchanger 16 is provided to the overhead accumulator 18 through conduit means 21. The uncondensed portion of the fluid flowing through conduit means 21 is removed from the overhead accumulator through conduit means 23. A first portion of the liquid in the overhead accumulator 18 is provided through the combination of conduit means 24 and 25 as an external reflux to the fractional distillation column 11. A second portion of the liquid in the accumulator 18 is removed through the combination of conduit means 24 and 26 as the ethylene product.

Heat is provided to the fractional distillation column 11 by providing liquid from the bottom of the fractional distillation column 11 through conduit means 31 to the reboiler 32. A heating medium is provided to the reboiler 32 through conduit means 34. The thus heated fluid is recycled to the fractional distillation column 11 through conduit means 35.

The fractional distillation process for separating ethylene from ethane described to this point is conventional. It is the manner in which the fractional distillation process is controlled so as to maintain a desired overhead product composition which provides the novel features of the present invention.

Analyzer transducer 41, which is preferably a Model 102 Process Chromatograph manufactured by Applied Automation, Inc., Bartlesville, Okla., is in fluid communication with conduit means 26 through conduit means 42. The analyzer transducer 41 provides an output signal 44 which is representative of the concentration of ethane in the ethylene product flowing through conduit means 26. Signal 44 is provided from the analyzer transducer 41 as the process variable input to the analyzer controller 46.

The analyzer controller 46 is also provided with signal 47 which is representative of the desired concentration of ethane in the ethylene product. In response to signals 46 and 47, the analyzer controller 46 provides an output signal 49 which is responsive to the difference between signals 44 and 47. Signal 49 is scaled so as to be representative of the temperature of a particular tray in the fractional distillation column 11 (any suitable tray can be used) required to maintain the actual concentration of ethane in the ethylene overhead product substantially equal to the desired concentration. Signal 49 is provided from the analyzer controller 46 as an input to the lag block 51, the summation block 52 and the temperature controller 50.

The temperature transducer 54 in combination with a temperature sensing device such as a thermocouple, which is operably located so as to measure the temperature in the fractional distillation column 11 at a tray in the lower portion of the fractional distillation column 11, provides an output signal 55 which is representative of the temperature at a tray in the lower portion of the fractional distillation column 11. Signal 55 is provided from the temperature transducer 54 as the process variable input to the temperature controller 50. In response to signals 49 and 55, the temperature controller 50 provides an output signal 60 which is responsive to the difference between signals 49 and 55. Signal 60 is scaled so as to be representative of the flow rate of the heating fluid flowing through conduit means 34 required to maintain the actual concentration of ethane in the ethylene overhead product substantially equal to the desired concentration. Signal 60 is provided from the temperature controller 50 as a set point input to the flow controller 53.

Flow transducer 56 in combination with the flow sensor 57, which is operably located in conduit means 34, provides an output signal 58 which is representative of the actual flow rate of the heating fluid flowing through conduit means 34. Signal 58 is provided from the flow transducer 56 as the process variable input to the flow controller 53. In response to signals 60 and 58, the flow controller 53 provides an output signal 59 which is responsive to the difference between signals 60 and 58. Signal 59 is scaled so as to be representative of the position of the control valve 61, which is operably located in conduit means 34, required to maintain the actual flow rate of the heating fluid through conduit means 34 substantially equal to the desired flow rate as represented by signal 49. Signal 59 is provided from the flow controller 53 as a control signal to the control valve 61.

Analyzer transducer 63, which is also preferably a Model 102 Process Chromatograph, is in fluid communication with conduit means 14 through conduit means 64. The analyzer transducer 63 provides an output signal 66 which is representative of the concentration of ethylene in the bottoms product. Signal 66 is provided from the analyzer transducer 63 as the process variable input to the analyzer controller 68.

The analyzer controller 68 is also provided with a set point signal 69 which is representative of the desired concentration of ethylene in the bottoms product. In response to signals 66 and 69, the analyzer controller 68 provides an output signal 71 which is responsive to the difference between signals 66 and 69. Signal 71 is scaled so as to be representative of the flow rate of the external reflux flowing through conduit means 25 required to maintain the actual concentration of ethylene in the bottoms product substantially equal to the desired concentration. Signal 71 is provided from the analyzer controller 68 as a first input to the summing block 74.

The lag block 51 is utilized to account for the time delay required for a change in the flow rate of the heating fluid flowing through conduit means 34 to effect a change in the composition of the overhead product. The output signal 75 from the lag block 51 will thus be representative of the magnitude of signal 49 delayed by the time constant of the lag 51. The time required for a change in the flow rate of the heating fluid flowing through conduit means 34 to effect a change in the overhead product composition is generally reasonably well known at least to the extent that the delay required by the lag 51 can be estimated with reasonable accuracy. Signal 75 is provided from the lag 51 to the minuend input of the summing block 52. Signal 75 is subtracted from signal 49 to establish signal 77 which is provided from the summing block 52 as an input to the multiplying block 70. The lag 51 is utilized to cancel the effect of signal 77 over a period of time that is determined by the time constant of the lag 51. The manner in which this is accomplished will be described more fully hereinafter.

In order to provide a signal which can be summed with signal 71 in the summing block 74, it is necessary to convert signal 77, which has units of temperature, to a flow rate. This is accomplished by multiplying signal 77 by a scaling factor signal 72 which has units of barrels/°C. hour. Signal 72 is multiplied by signal 77 to establish signal 73 which is representative of a flow rate. The magnitude of signal 72 is chosen in such a manner that the flow rate represented by signal 73 when added to the flow rate represented by signal 71 will cause a change in the flow rate of the external reflux flowing through conduit means 25 which will result in a desired change in the composition of the overhead product. Generally, the change in the flow rate of the external reflux flowing through conduit means 25 required to effect a particular change in the composition of the overhead product will be known for a particular distillation tower. The magnitude of signal 72 can be chosen based on this knowledge and the knowledge that signal 77 essentially provides an indication of the degree to which the overhead product composition is off-specification.

Flow transducer 83 in combination with the flow sensor 84, which is operably located in conduit means 25, provides an output signal 86 which is representative of the flow rate of the external reflux flowing through conduit means 25. Signal 86 is provided from the flow transducer 83 as the process variable input to the flow controller 87. The flow controller 87 is also provided with a set point signal 88 which is representative of the summation of signals 71 and 77.

In response to signals 86 and 88, the flow controller 87 provides an output signal 91 which is responsive to the difference between signals 86 and 88. Signal 91 is scaled so as to be representative of the position of the control valve 92 required to maintain the actual flow rate of the external reflux substantially equal to the desired flow rate as represented by signal 88. Signal 91 is provided as a control signal from the flow controller 87 to the control valve 92.

If it is assumed that the actual concentration of ethane in the overhead product has been substantially equal to the desired concentration for the overhead product for a period of time at least equal to the time constant of the lag 51, then the magnitude of signal 77 will be substantially zero. Under these conditions the magnitude of signal 88 will be substantially equal to the magnitude of signal 71 and the overhead product composition will be maintained by manipulating the flow rate of the heating fluid flowing through conduit means 34 in response to signal 49. Now, assuming that the concentration of ethane in the overhead product changes, signal 77 will assume some magnitude because signal 75 will not change as quickly as signal 49. This will cause a quick response to occur with respect to the magnitude of signal 88 which directly controls the flow rate of the external reflux flowing through conduit means 25. The flow rate of the external reflux flowing through conduit means 25 can be changed quickly to force the concentration of ethane in the overhead product to return to a desired concentration. Thus, a very quick response is provided to a change in ethane concentration.

The magnitude of signal 75 will slowly change until the magnitude of signal 75 is substantially equal to the magnitude of signal 49. The magnitude of signal 77 will slowly decrease as this occurs until a steady-state condition is again reached and the magnitude of signal 77 is again substantially zero. Essentially, signal 49 will have had time to cause the flow rate of the heating fluid flowing through conduit means 34 to change in such a manner that the concentration of ethane in the overhead product will be at the desired concentration when signal 77 has again returned to a magnitude of substantially zero.

The flow rate of the external reflux is still utilized to maintain a desired concentration of ethylene in the bottoms product. The analyzer controller 68 is tuned slowly enough that it will not interfere with the temporary overhead product composition control by manipulating valve 92.

The invention has been described in terms of a preferred embodiment as illustrated in FIG. 1. Specific components used in the practice of the invention as illustrated in FIG. 1 such as flow sensors 84 and 57; flow transducers 83 and 56; flow controllers 53 and 87; temperature transducer 54; temperature controller 50; and control valves 61 and 92 are each well known, commercially available control components such as are described at length in Perry's *Chemical Engineers Handbook*, 4th Edition, Chapter 22, McGraw-Hill. The above listed components are preferably analog components while the remaining control components such as analyzer controllers 46 and 68, summing blocks 74 and 52, multiplying block 70 and lag 51 are preferably implemented on the Optrol 7000 Digital Computer.

For reasons of brevity, conventional auxiliary fractionation equipment such as pumps, heat exchangers, additional measurement-control devices, etc. have not been included in the above description as they play no part in the explanation of the invention. In particular, other conventional steps of an ethylene manufacturing process which play no part in the present invention have not been included.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:

a fractional distillation column means;

means for passing a feed mixture containing at least first and second components into said fractional distillation column means;

means for supplying heat to said fractional distillation column means;

means for withdrawing an overhead vapor stream, having a substantially increased concentration of said first component with respect to the concentration of said first component in said feed mixture, from an upper portion of said fractional distillation column means;

means for condensing at least a portion of said overhead vapor stream;

accumulator means;

means for passing the resulting at least partially condensed overhead stream into said accumulator means;

means for withdrawing condensate from said accumulator means and for passing a first portion of the thus withdrawn condensate into an upper portion of said fractional distillation column means as an external reflux therefor and for passing a second portion of the thus withdrawn condensate as an overhead product stream;

means for withdrawing a bottoms product stream, having a substantially increased concentration of said second component with respect to the concentration of said second component in said feed mixture, from a lower portion of said fractional distillation column means;

means for establishing a first signal representative of the concentration of said second component in said overhead product stream;

means for establishing a second signal representative of the desired concentration of said second component in said overhead product stream;

means for comparing said first signal and said second signal and for establishing a third signal which is responsive to the difference between said first signal and said second signal;

means for manipulating the heat supplied to said fractional distillation column means in response to said third signal;

means for establishing a bias signal in response to said third signal;

means for establishing a fourth signal which is representative of the actual concentration of said first component in said bottoms product stream;

means for establishing a fifth signal which is representative of the desired concentration of said first component in said bottoms product stream;

means for comparing said fourth signal and said fifth signal and for establishing a sixth signal which is responsive to the difference between said fourth signal and said fifth signal;

means for summing said bias signal and said sixth signal to establish a seventh signal; and means for manipulating the flow rate of said external reflux in response to said seventh signal.

2. Apparatus in accordance with claim 1 wherein said third signal is scaled so as to be representative of the temperature at a tray in said fractional distillation column means required to maintain the actual concentration of said second component in said overhead product stream substantially equal to the desired concentration and wherein said means for establishing said bias signal comprises:

a lag means;

means for passing said third signal through said lag means to establish an eighth signal which is representative of said third signal delayed by the time constant of said lag means;

means for subtracting said eighth signal from said third signal to establish a ninth signal; and means for multiplying said ninth signal by a scaling factor signal to establish said bias signal which is representative of a flow rate.

3. Apparatus in accordance with claim 2 wherein said sixth signal is scaled so as to be representative of the flow rate of said external reflux required to maintain the actual concentration of said first component in said bottoms product stream substantially equal to the desired concentration and wherein said means for manipulating the flow rate of said external reflux in response to said seventh signal comprises:

a first control valve means operably located so as to control the flow rate of said external reflux;

means for establishing a tenth signal representative of the actual flow rate of said external reflux;

means for comparing said ninth signal and said tenth signal and for establishing an eleventh signal which is responsive to the difference between said ninth signal and said tenth signal, wherein said eleventh signal is scaled so as to be representative of the position of said first control valve means required to maintain the actual flow rate of said external reflux substantially equal to the flow rate represented by said ninth signal; and means for supplying said eleventh signal as the control signal to said first control valve means.

4. Apparatus in accordance with claim 2 wherein said means for supplying heat to said fractional distillation column means comprises:

a heat exchanger means;

means for supplying a heating fluid to said heat exchanger means;

means for passing a fluid withdrawn from a lower portion of said fractional distillation column means through said heat exchanger means and for recycling the fluid passed through said heat exchanger means to said fractional distillation column means.

5. Apparatus in accordance with claim 4 wherein said means for manipulating the heat supplied to said fractional distillation column means in response to said third signal comprises:

a second control valve means operably located so as to control the flow rate of said heating fluid to said heat exchanger means;

means for establishing a tenth signal which is representative of the actual temperature at said tray in said fractional distillation column means;

means for comparing said third signal and said tenth signal and for establishing an eleventh signal which is responsive to the difference between said third signal and said tenth signal, wherein said eleventh signal is scaled so as to be representative of the heat which must be supplied to said fractional distillation column means to maintain the actual concentration of said second component in said overhead product stream substantially equal to the desired concentration;

means for establishing a twelfth signal which is representative of the actual flow rate of said heating fluid to said heat exchanger means;

means for comparing said eleventh signal and said twelfth signal and for establishing a thirteenth signal which is responsive to the difference between said eleventh signal and said twelfth signal, wherein said thirteenth signal is scaled so as to be representative of the position of said second control valve means required to maintain the actual flow rate of said heating fluid to said heat exchanger means substantially equal to the desired flow rate; and means for supplying said thirteenth signal as a control signal to said second control valve means.

6. Apparatus in accordance with claim 1 wherein said first component is ethylene and said second component is ethane.

7. A method for controlling a fractional distillation process in which heat is utilized to separate first and second components contained in a feed stream flowing to a fractional distillation column, wherein said first component is principally removed from said fractional distillation column as an overhead vapor stream, wherein said overhead vapor stream is at least partially condensed with a first portion of the condensate being returned to an upper portion of said fractional distillation column as an external reflux and a second portion of said condensate being removed from said fractional distillation process as an overhead product, and wherein said second component is principally removed from said fractional distillation column as a bottoms product, said method comprising the steps of:

establishing a first signal representative of the concentration of said second component in said overhead product;

establishing a second signal representative of the desired concentration of said second component in said overhead product;

comparing said first signal and said second signal and establishing a third signal which is responsive to the difference between said first signal and said second signal;

manipulating the heat supplied to said fractional distillation column in response to said third signal;

establishing a bias signal in response to said third signal;

establishing a fourth signal which is representative of the actual concentration of said first component in said bottoms product stream;

establishing a fifth signal which is representative of the desired concentration of said first component in said bottoms product stream;

comparing said fourth signal and said fifth signal and for establishing a sixth signal which is responsive to the difference between said fourth signal and said fifth signal;

summing said bias signal and said sixth signal to establish a seventh signal; and manipulating the flow rate of said external reflux in response to said seventh signal.

8. A method in accordance with claim 7 wherein said third signal is scaled so as to be representative of the temperature at a tray in said fractional distillation column required to maintain the actual concentration of said second component in said overhead product stream substantially equal to the desired concentration and wherein said step of establishing said bias signal comprises:

lagging said third signal to establish an eighth signal which is representative of said third signal delayed by a time constant;

subtracting said eighth signal from said third signal to establish a ninth signal; and multiplying said ninth signal by a scaling factor signal to establish said bias signal which is representative of a flow rate.

9. A method in accordance with claim 8 wherein said sixth signal is scaled so as to be representative of the flow rate of said external reflux required to maintain the actual concentration of said first component in said bottoms product stream substantially equal to the desired concentration and wherein said step of manipulating the flow rate of said external reflux in response to said seventh signal comprises:

establishing a tenth signal representative of the actual flow rate of said external reflux;

comparing said ninth signal and said tenth signal and establishing an eleventh signal which is responsive to the difference between said ninth signal and said tenth signal, wherein said eleventh signal is scaled so as to be representative of the position of a first control valve required to maintain the actual flow rate of said external reflux substantially equal to the flow rate represented by said ninth signal, wherein said first control valve is operably located so as to control the flow of said external reflux; and supplying said eleventh signal as the control signal to said first control valve means.

10. A method in accordance with claim 8 wherein said step of supplying heat to said fractional distillation column comprises:

withdrawing a fluid from a lower portion of said fractional distillation column;

passing the thus withdrawn fluid in heat exchange with a heating fluid; and recycling the heated fluid to said fractional distillation column.

11. A method in accordance with claim 10 wherein said step of manipulating the heat supplied to said fractional distillation column in response to said third signal comprises:

establishing a tenth signal which is representative of the actual temperature at said tray in said fractional distillation column;

comparing said third signal and said tenth signal and establishing an eleventh signal which is responsive to the difference between said third signal and said tenth signal, wherein said eleventh signal is scaled so as to be representative of the heat which must be supplied to said fractional distillation column to maintain the actual concentration of said second component in said overhead product stream substantially equal to the desired concentration;

establishing a twelfth signal which is representative of the actual flow rate at which said heating fluid is passing in heat exchange with the fluid withdrawn from said fractional distillation column;

comparing said eleventh signal and said twelfth signal and establishing a thirteenth signal which is responsive to the difference between said eleventh signal and said twelfth signal, wherein said thirteenth signal is scaled so as to be representative of the position of a second control valve required to maintain the actual flow rate of said heating fluid substantially equal to the desired flow rate, wherein said second control valve is operably located so as to control the flow of said heating fluid; and supplying said thirteenth signal as a control signal to said second control valve.

12. A method in accordance with claim 7 wherein said first component is ethylene and said second component is ethane.

* * * * *